Nov. 1, 1927.
G. W. COOK
STEERING POST GUARD
Filed Aug. 18, 1926
1,647,903
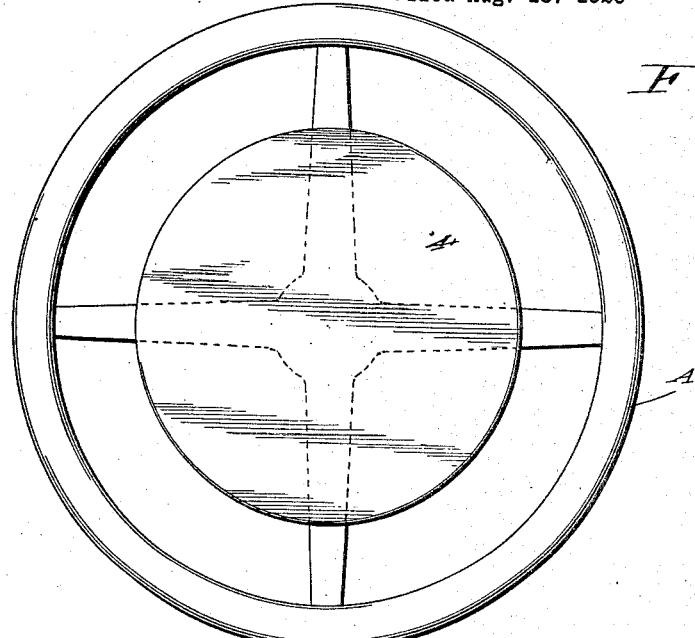
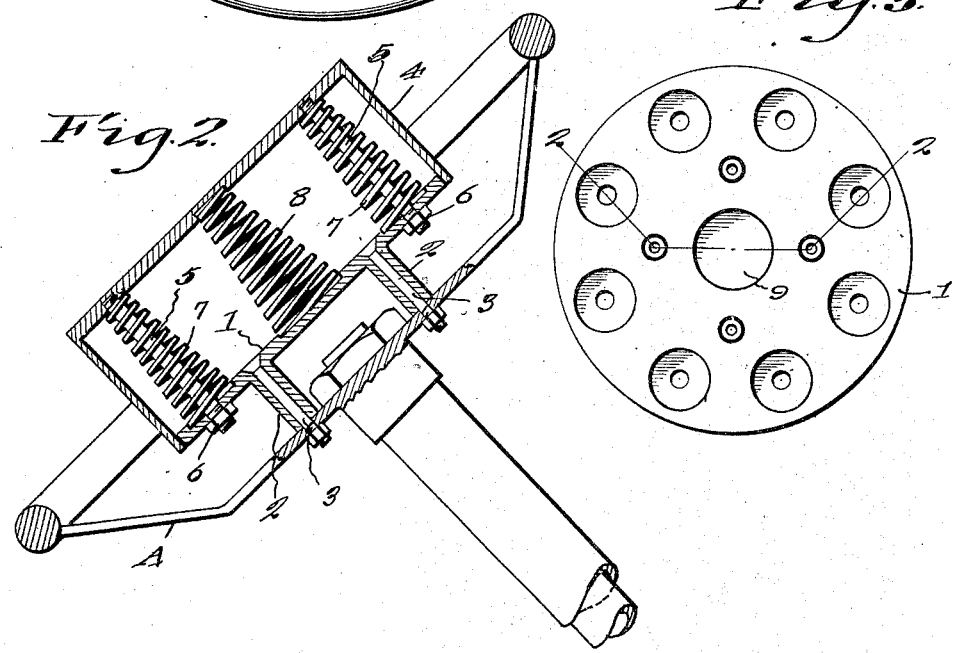

Patented Nov. 1, 1927.

1,647,903

UNITED STATES PATENT OFFICE.

GEORGE WILLIAM COOK, OF RAINIER, OREGON.

STEERING-POST GUARD.

Application filed August 18, 1926. Serial No. 130,041.

This invention relates to an attachment for the steering wheel of a motor vehicle, the general object of the invention being to provide means for preventing the upper end of the steering post or the wheel, from injuring the driver if the driver should be thrown upon the wheel as the result of an accident.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a plan view of a wheel showing the invention applied thereto.

Figure 2 is a sectional view through a wheel and the attachment.

Figure 3 is a view of the attachment, with the cover removed.

In these views, 1 indicates a base of circular formation which is provided with the hollow depending posts 2 through which bolts 3 may pass in order to fasten the base to the hub of a steering wheel, such as shown at A. A casing-like cover 4 fits over the base, bolts 5 being connected with the inner face of the top of the cover and passing through holes in the base so that the cover is slidably connected with the base. The nuts 6 on the bolts limit the movement of the cover away from the base. Coiled springs 7 are placed on the bolts and engage the base and the cover and tend to hold the cover in its outward limit of movement. A large coiled spring 8 is arranged at the center of the device and has its ends engaging recesses 9 in both the cover and the base.

From the foregoing, it will be seen that if an accident should occur, which would throw the driver upon the steering wheel, the cover would move inwardly under the force of the blow and the weight of the body of the driver, but this movement will be resisted by the springs so that the movement of the body of the driver will be checked and thus he will be prevented from being injured by violent contact with the steering wheel. In some cases, the steering wheel will break and the steering column might penetrate the body of the driver, but with this attachment, this is prevented, as the device covers the end of the column.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An attachment for the steering wheel of a motor vehicle for preventing injury to a person thrown against the wheel comprising a supporting member adapted to be attached to a part of the wheel, a movable casing slidably engaging the supporting member and extending above the wheel so that a person falling toward the wheel will strike the casing and spring means for normally holding the casing in its outward position.

2. An attachment for a steering wheel of a motor vehicle comprising a base plate, means for attaching the same to the hub of a wheel, a casing-like cover slidably mounted on the plate, bolts connected with the cover and passing through holes in the plate for guiding the cover, springs on the bolts for resisting the inward movement of the cover and a central spring having its ends engaging the cover and the plate.

In testimony whereof I affix my signature.

GEORGE WILLIAM COOK.